US006473214B1

(12) United States Patent
Roberts et al.

(10) Patent No.: US 6,473,214 B1
(45) Date of Patent: Oct. 29, 2002

(54) METHODS OF AND APPARATUS FOR OPTICAL SIGNAL TRANSMISSION

(75) Inventors: Kim B. Roberts, Nepean (CA); Maurice S. O'Sullivan, Ottawa (CA); Richard R. Habel, Kanata (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/283,213

(22) Filed: Apr. 1, 1999

(51) Int. Cl.$^7$ ............................................... H04B 10/04
(52) U.S. Cl. ........................................ 359/181; 359/184
(58) Field of Search ................................. 359/180–188

(56) References Cited

U.S. PATENT DOCUMENTS

| | | | |
|---|---|---|---|
| 4,700,352 A | 10/1987 | Shikada et al. | 372/20 |
| 5,543,952 A | 8/1996 | Yonenaga et al. | 359/181 |
| 5,903,376 A * | 5/1999 | Hofstetter et al. | 359/132 |
| 6,097,525 A * | 8/2000 | Ono et al. | 359/180 |

FOREIGN PATENT DOCUMENTS

| | | | |
|---|---|---|---|
| EP | 0825733 | 2/1998 | H04B/10/155 |
| WO | 98/44635 | 10/1998 | |

OTHER PUBLICATIONS

Aisawa, S. "A 1580–nm Band WDM Transmission Technology Employing Optical Duobinary Coding", IEEE Feb. 1999.*

R. Noe; M.W. Maeda; S.G. Menocal; C–E Zah; Pattern–Independent FSK Heterodyne Transmission with AMI Signal Format and Two Channel Crosstalk Measurements; Journal of Optical Communications; 10(1989) Sep.; No. 3, Berlin, DE; pp 82–84.

(List continued on next page.)

Primary Examiner—Leslie Pascal
Assistant Examiner—Agustin Bello

(57) ABSTRACT

A binary signal is encoded to produce a three-level encoded signal having reduced bandwidth and small low frequency and d.c. components, e.g. using modified duobinary encoding, the encoded signal directly modulating a semiconductor laser to produce a frequency modulated optical signal, which is passed through an interference filter to provide two-state amplitude modulation from the three-state frequency modulation for direct recovery of the binary signal by an optical receiver, the interference filter providing constructive and destructive interference for frequencies corresponding to binary one and zero bits respectively. An array transmission system can be provided by combining multiple such frequency modulated optical signals, from multiple lasers with respective central frequencies and respective encoders for multiple binary signals, using an array waveguide which also serves as a channel frequency filter, with a single interference filter. Polarization modulation instead of frequency modulation, and external modulation of an optical signal from an optical source, are also described.

37 Claims, 2 Drawing Sheets

OTHER PUBLICATIONS

"5 Gbit/s Optical FSK Modulation of a 1530–nm DFB Laser", R.S. Vodhanel et al., European Conference on Optical Communication 1988, pp. 171–174.

"Bipolar Optical FSK Transmission Experiments at 150 Mbit/s and 1 Gbit/s", R.S. Vodhanel et al., Journal of Lightwave Technology, vol. 6, No. 10, Oct. 1988, pp. 1549–1553.

"Dispersion Tolerant Optical Transmission System Using Duobinary Transmitter and Binary Receiver", K. Yonenaga et al., Journal of Lightwave Technology, vol. 15, No. 8, Aug. 1997, pp. 1530–1537.

"10–Gb/s Optical Transmission up to 253 km Via Standard Single–Mode Fiber Using the Method of Dispersion–Supported Transmission", B. Wedding et al., Journal of Lightwave Technology, vol. 12, No. 10, Oct. 1994, pp. 1720–1727.

"Partial–Response Signalling",. P. Kabal et al., IEEE Transactions on Communications, vol. COM–23, No. 9, Sep. 1975, pp. 921–934.

"An N x N Optical Multiplexer Using a Planar Arrangement of Two Star Couplers", C. Dragone, IEEE Photonics Technology Letters, vol. 3, No. 9, Sep. 1991, pp. 812–815.

* cited by examiner

//]:#

METHODS OF AND APPARATUS FOR OPTICAL SIGNAL TRANSMISSION

REFERENCE TO RELATED APPLICATION

U.S. patent application Ser. No. 09/048,402 filed Mar. 25, 1998 in the names of K. B. Roberts et al. (corresponding to UK patent application No. 9802913.5 filed Feb. 11, 1998) entitled "Multiplexed Transmission Of Optical Signals" relates to high capacity optical transmission systems in which optical signals are multiplexed using a waveguide array to provide a relatively large number of transmission channels and hence a very high transmission capacity of the order of 1 Tb/s (one terabit, or $10^{12}$ bits, per second). The entire disclosure of this United States patent application is hereby incorporated herein by reference.

BACKGROUND OF THE INVENTION

In an array transmission system as described in the application referred to above, optical pulses from a laser source are split into a large number of channels by a waveguide array, and optical signals of the channels are modulated by respective modulators and are combined by another waveguide array to be communicated over an optical fiber path. Such a system can provide high spectral density, but requires a relatively large number of modulators.

It is known that optical fiber chromatic dispersion is a limiting factor for transmission distance in high speed optical communications systems. Another important criterion in an array transmission system as discussed above is the implementation of the system, particularly in relation to the costs and technical complexity and risks associated with the modulators.

It would be desirable to avoid the need for external modulators by providing direct modulation of a semiconductor laser. Amplitude modulation (AM) of the intensity of the optical signal produced by the laser enables direct detection at an optical receiver to recover the original binary signal. However, direct AM of a semiconductor laser results in the optical signal having a spectral occupancy, or frequency chirp, that is not acceptable for long distance transmission due to the chromatic dispersion of the fiber.

This difficulty can be addressed by performing direct frequency modulation (FM) of the semiconductor laser, and converting the resulting FM optical signal to an AM optical signal using a bandpass optical filter, for example as described in "5 Gbit/s Optical FSK Modulation Of A 1530-nm DFB Laser" by R. S. Vodhanel et al., European Conference on Optical Communication, 1988. As described there, a DFB (distributed feedback) laser is modulated with a pseudo-random NRZ (non-return to zero) binary signal and the resulting FSK (frequency shift keyed, i.e. FM) optical signal is conducted via an etalon and an optical fiber to a p-i-n photodiode detector, the etalon serving to perform FSK demodulation.

While this provides improved performance compared with direct AM, it remains inadequate for long distance transmission. In particular, the above article recognizes that the laser has a non-uniform low-frequency FM response which can distort the optical FSK signal and produce errors in the communicated signal. This non-uniformity is understood to be a result of thermal frequency shift of the laser, and particularly affects that part of the spectrum of the signal being transmitted that is below a frequency of about 20 MHz.

"Bipolar Optical FSK Transmission Experiments at 150 Mbit/s and 1 Gbit/s" by R. S. Vodhanel et al., Journal of Lightwave Technology, Vol. 6, No. 10, October 1988, pages 1549–1553, mentions various modulation techniques, such as Manchester coding, proposed to eliminate unwanted thermal frequency modulation of semiconductor lasers, and proposes using a bipolar signal format for this purpose. The bipolar signal has a signal power or energy which decreases towards zero for low frequency signal components towards zero frequency, so that the undesired thermal frequency modulation of the laser at low frequencies is reduced. However, the optical receiver is much more complicated, in this case requiring a frequency discriminator for demodulation and using a Schmitt trigger to convert the demodulated signal from the bipolar format back to its original NRZ form. In addition, Manchester coding or this bipolar format increases the spectral occupancy of the resulting optical signal, which as discussed above results in reduced performance for long distance transmission due to chromatic dispersion.

It is known, for example from Yonenaga et al., "Dispersion-Tolerant Optical Transmission System Using Duobinary Transmitter and Binary Receiver", Journal of Lightwave Technology, Vol. 15, No. 8, August 1997, pages 1530–1537, and from Yonenaga et al. U.S. Pat. No. 5,543,952 issued Aug. 6, 1996 and entitled "Optical Transmission System", to use duobinary code for a modulating signal supplied in push-pull manner to a dual-drive Mach-Zehnder (MZ) type optical intensity modulator in an optical communications system. The use of duobinary code in this manner reduces the signal bandwidth required for a given signal transmission rate, and permits direct detection to recover the original binary signal at an optical receiver. Such an arrangement again requires an external modulator and involves the costs and risks associated therewith especially in an array transmission system. For example, cross-talk of high voltage, high frequency signals among closely spaced electrical circuits presents a significant problem, and modulation using duobinary encoded signals as disclosed by Yonenaga et al. doubles the voltage swings of signals supplied to the modulators, thereby exacerbating this problem.

An alternative duobinary encoding technique is described in International patent application PCT/CA98/00275 by Northern Telecom Limited, published Oct. 8, 1998 under No. WO 98/44635 and entitled "Duobinary Coding And Modulation Technique For Optical Communication Systems".

The article by Yonenaga et al. referred to above also refers to a dispersion-supported transmission (DST) technique, as disclosed by B. Wedding et al., "10-Gb/s optical transmission up to 253 km Via Standard Single-Mode Fiber Using the Method of Dispersion-Supported Transmission", Journal of Lightwave Technology, Vol. 12, No. 10, October 1994, pages 1720–1727. The DST technique uses direct modulation of a laser diode with a NRZ binary signal to produce an FSK optical signal, and FM-AM conversion in the dispersive optical fiber with direct detection of the AM component at an optical receiver. Consequently, the DST technique requires the frequency deviation of the FSK optical signal to be adjusted, depending upon the chromatic dispersion of the fiber, to match the group delay between the FSK components to the bit duration. In addition, recovery of the NRZ binary signal from the detected AM component of the converted optical signal requires additional processing, for example by an integrator and a decision circuit.

This invention seeks to facilitate optical signal transmission of high speed signals over long distances, with relatively low technical complexity and cost, in a manner that can be suitable or advantageous for use for array transmission.

SUMMARY OF THE INVENTION

One aspect of this invention provides a method of producing an amplitude modulated optical signal representing a binary signal, comprising the steps of: encoding the binary signal to produce a three-level encoded signal, the encoded signal having two outer levels representing a first state of the binary signal and having an intermediate level representing a second state of the binary signal; producing an optical signal frequency modulated in accordance with the three-level encoded signal; and optically converting the frequency modulated optical signal in dependence upon its frequency to produce an amplitude modulated optical signal having first and second amplitudes representing the first and second states of the binary signal.

Preferably the step of producing the frequency modulated optical signal comprises direct modulation of a semiconductor laser by the encoded signal.

The step of encoding preferably encodes the binary signal in accordance with a polynomial having factors (1−D) and (1+D) where D is a delay operator for the binary signal, and conveniently comprises modified duobinary encoding and precoding of the binary signal. The encoded signal consequently has reduced (halved) bandwidth compared with the binary signal, substantially zero d.c. component, and relatively little low frequency energy. This enables the generation of an optical signal with reduced spectral occupancy and substantially no carrier frequency component, and the problem of low-frequency non-uniformity of the direct-modulated laser is substantially reduced.

Preferably the step of optically converting the frequency modulated optical signal comprises conducting the optical signal via an interference filter having two paths producing constructive and destructive interference for different optical signal frequencies representing the two states of the binary signal. One and zero bits of the binary signal can be represented by respective frequencies of the frequency modulated optical signal for which the interference filter provides constructive and destructive interference respectively, to facilitate direct recovery of the binary signal from the optical signal as received at an optical receiver. The method desirably includes the step of controlling a central frequency of the frequency modulated optical signal for maximum destructive interference in the interference filter for zero bits of the binary signal.

Conveniently the two paths of the interference filter provide a differential time delay of the optical signal which is of the same order as a bit period of the binary signal.

Another aspect of the invention provides a method of transmitting a plurality of binary signals, comprising producing a plurality of optically multiplexed amplitude modulated optical signals, each representing a respective one of the plurality of binary signals, each by the above method, wherein the steps of encoding the binary signal and producing the frequency modulated optical signal are carried out individually for the respective binary signals to produce respective frequency modulated optical signals having different central frequencies, the method including a step of optically combining the frequency modulated optical signals, and wherein the step of optically converting the frequency modulated optical signals is carried out on the combined frequency modulated optical signals using a single interference filter.

Preferably the step of optically combining the frequency modulated optical signals comprises optically filtering the frequency modulated optical signals in accordance with respective frequency channels.

A further aspect of the invention provides a method of producing an amplitude modulated optical signal representing a binary signal, comprising the steps of: encoding the binary signal to produce a three-level encoded signal, the encoded signal having two outer levels representing a first state of the binary signal and having an intermediate level representing a second state of the binary signal; producing an optical signal with a polarization that is modulated in accordance with the three-level encoded signal; and filtering the optical signal in dependence upon its polarization to produce an amplitude modulated optical signal having first and second amplitudes representing the first and second states of the binary signal.

Thus polarization modulation and a polarization filter can be used instead of frequency modulation and an interference filter. In this case preferably one and zero bits of the binary signal are represented by orthogonal polarizations of the modulated optical signal for which the step of filtering provides relative transmission and attenuation respectively.

The invention also provides an optical signal transmitter comprising: an encoder for encoding a binary signal to produce a three-level encoded signal, the encoded signal having two outer levels representing a first state of the binary signal and having an intermediate level representing a second state of the binary signal; a semiconductor laser directly modulated by the encoded signal to produce a frequency modulated optical signal; and an optical interference filter to which the frequency modulated optical signal is supplied, the interference filter producing an amplitude modulated optical signal by constructive and destructive interference at different frequencies of the frequency modulated optical signal.

In addition, the invention provides an optical transmission system comprising: a plurality of N encoders each for encoding a respective binary signal to produce a respective three-level encoded signal having reduced bandwidth and d.c. components compared with the respective binary signal; N semiconductor lasers each directly modulated by a respective encoded signal to produce a respective one of N frequency modulated optical signals having different frequency ranges; an optical combiner arranged to combine the frequency modulated optical signals in their respective frequency ranges; and an optical interference filter to which the combined frequency modulated optical signals are supplied, the interference filter producing in each of said respective frequency ranges an amplitude modulation of the optical signal by constructive and destructive interference at different frequencies of the respective frequency modulated optical signal, the amplitude modulation providing two states representing the binary states of the respective binary signal.

Furthermore, the invention provides an optical signal transmitter comprising: an encoder arranged to encode a binary signal to produce a three-level encoded signal having reduced bandwidth and d.c. components compared with the binary signal; a modulator arranged to modulate polarization of an optical signal in accordance with the three-level encoded signal; and a polarization filter arranged to filter the optical signal in dependence upon its polarization to produce an amplitude modulated optical signal having first and second amplitudes representing the first and second states of the binary signal.

The invention also extends to all useful, novel, and inventive combinations and sub-combinations of the various

BRIEF DESCRIPTION OF THE DRAWINGS

The invention will be further understood from the following description with reference to the accompanying drawings, in which.

DETAILED DESCRIPTION

Figure 1:
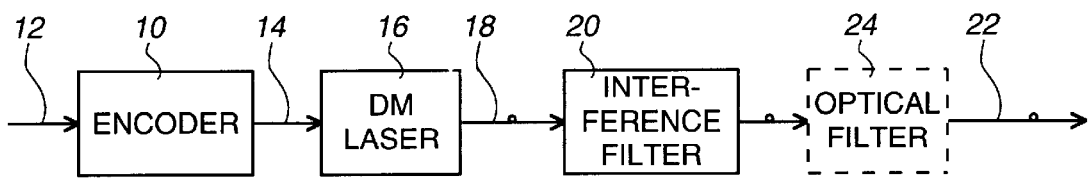
FIG. 1 schematically illustrates in a block diagram parts of an optical signal transmitter in accordance with an embodiment of the invention.

Referring to the drawings, FIG. 1 illustrates in a block diagram parts of an optical signal transmitter, or optical transmission system, in accordance with an embodiment of the invention.

The optical transmitter of FIG. 1 comprises an encoder 10, which is supplied with a binary electrical signal via an input line 12 and produces an encoded electrical signal on a line 14; a semiconductor laser 16 which is directly modulated by the encoded electrical signal on the line 14 and produces an optical signal on an optical path 18, and an optical interference filter 20 to which the optical signal on the path 18 is supplied and which produces a resulting optical signal on an optical path 22, which may for example be a long distance single mode optical fiber for communicating the optical signal to a distant optical receiver. The optical transmitter may also optionally include an optical filter 24, shown in dashed lines to indicate that it is optional, in the optical path 22 as shown or in the optical path 18.

The encoder 10 converts the binary input signal on the line 12 to a three-level, or ternary, signal, constituting the encoded electrical signal on the line 14. The encoder 10 desirably incorporates a precoder for avoiding error propagation in known manner and as further described below. The binary input signal on the line 12 is for example a binary NRZ signal at a high bit rate, for example 2.5 Gb/s or more. The three-level encoded electrical signal on the line 14 has two outer levels (e.g. positive and negative voltages of equal magnitude) which both represent a first state of the binary input signal (e.g. a binary 1), and an intermediate or inner level (e.g. zero voltage) which represents a second state of the binary input signal (e.g. a binary 0).

The encoding function which is performed by the encoder 10 is chosen not only to produce the encoded three-level signal on the line 14 as described above, which facilitates reception of the ultimate optical signal by the optical receiver, but also to provide an optimal combination of the following properties:

(a) a bandwidth of the encoded signal that is substantially less than, for example is half, the bandwidth of the binary input signal;

(b) substantially zero energy in the encoded signal at zero frequency (d.c.); and (c) relatively little low-frequency energy in the encoded signal.

Property (a) is desirable because the reduced bandwidth of the encoded signal results in reduced chromatic dispersion of the optical signal, which as explained above is a significant limiting factor for high-speed long-distance optical communications. It is noted that this can be met by duobinary encoding in the prior art, but is not met by AMI (alternate mark inversion) or bipolar encoding or by Manchester encoding, also referred to in the prior art.

Property (b) results in the elimination of any carrier frequency component from the resulting optical signal, which is desirable in order to reduce so-called four-wave mixing, which is a significant problem in array transmission systems with closely spaced optical wavelengths.

Property (c) substantially reduces the low-frequency (e.g. below about 20 MHz) energy components in the electrical signal which directly modulates the laser 16, thereby substantially reducing the undesired thermal effects of non-uniform FM of the laser at such frequencies. It is noted that this is met by AMI encoding, but not by the duobinary encoding of the prior art.

Figure 2:
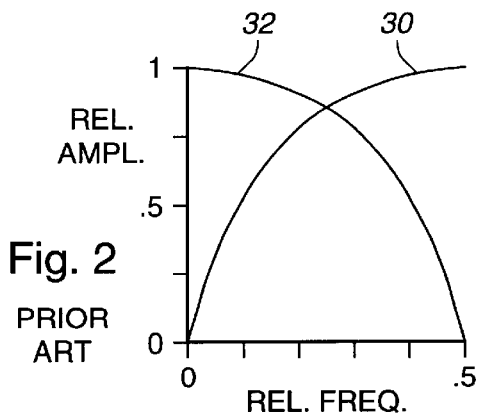
FIGS. 2 and 3 illustrate known amplitude spectra for various encoding functions.
Figure 3:
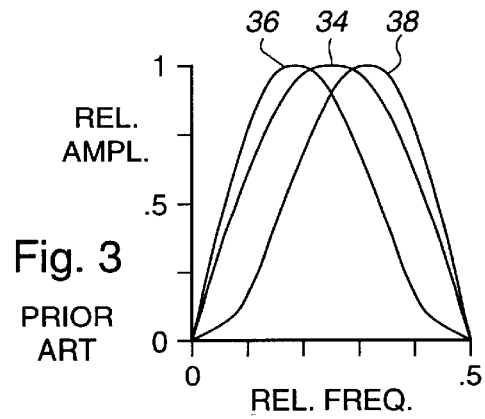

FIGS. 2 and 3 illustrate relative amplitude spectra, for relative frequencies from zero to half the symbol rate or bit rate of the binary signal, for some encoding functions which come within a category generally known as partial response signalling (PRS). In this respect, reference is directed for example to "Partial-Response Signalling" by P. Kabal et al., IEEE Transactions on Communications, Volume COM-23, No. 9, September 1975, pages 921–934. In that article, these PRS functions are described in terms of polynomials which are combinations of (1+D) and/or (1−D), where D is the delay operator.

In FIG. 2, a curve 30 represents the amplitude spectrum for the PRS polynomial (1−D), which corresponds to AMI encoding discussed above. It can be seen that although this has zero amplitude at d.c. and relatively small amplitude at low frequencies (properties (b) and (c)), the amplitude increases to a relative frequency of 0.5 so that property (a) is not met. Also in FIG. 2, a curve 32 represents the amplitude spectrum for the PRS polynomial (1+D), which constitutes conventional duobinary encoding and is referred as PRS Class 1. It can be seen that although this has zero amplitude at a relative frequency of 0.5 so that property (a) is met, at d.c. and low frequencies the amplitude is substantial so that properties (b) and (c) are not met.

In FIG. 3, a curve 34 represents the amplitude spectrum for the PRS polynomial $(1+D)(1-D)=1-D^2$; this is also commonly referred to as modified duobinary (MDB) encoding and is referred as PRS Class 4. It can be seen that this has zero amplitude at d.c. and at a relative frequency of 0.5, and relatively small amplitude at low frequencies, so that all of properties (a), (b) and (c) are met.

In addition, in FIG. 3 a curve 36 represents the amplitude spectrum for the PRS polynomial $(1+D)^2(1-D)=1+D-D^2-D^3$, and a curve 38 represents the amplitude spectrum for the PRS polynomial $(1+D)(1-D)^2=1-D-D^2+D^3$. These are also referred to as polybipolar encoding, or generalized or modified modified duobinary encoding. It can be seen that these also have zero amplitude at d.c. and at a relative frequency of 0.5, and relatively small amplitude at low frequencies, so that again all of properties (a), (b) and (c) are met.

In a presently preferred embodiment of the invention, the encoder 10 of FIG. 1 is constituted by a modified duobinary encoder and precoder. Suitable forms of modified duobinary encoder and precoder are known in themselves, but for completeness such a modified duobinary encoder and precoder is described below with reference to FIG. 4.

Figure 4:
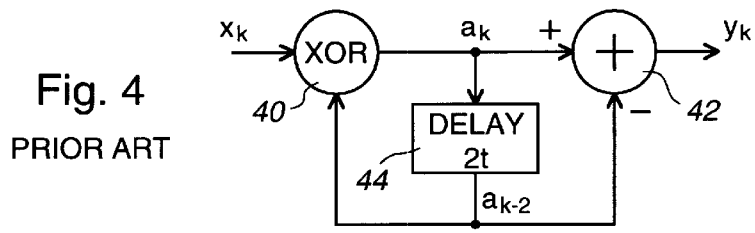
FIG. 4 schematically illustrates a known modified duobinary precoder and encoder.

Referring to FIG. 4, an MDB encoder and precoder are constituted by a modulo-2 adder (which is the same as a modulo-2 subtracter) or exclusive-OR (XOR) gate 40, an adder 42 having additive (+) and subtractive (−) inputs for performing a subtraction, and a delay element 44 providing a delay of 2t where t is the period of binary digits $x_k$ of an input signal to be encoded. Each input bit $x_k$ is supplied to one input of the XOR gate 40, the output of which is a precoded bit $a_k$. Each bit $a_k$ is supplied to the additive input of the adder 42, and is also delayed for two bit periods by the delay unit 44 to produce delayed precoded bits $a_{k-2}$. The delayed precoded bits are supplied to the other input of the XOR gate 40 and to the subtractive input of the adder 42, an output of which produces encoded symbols $y_k$. Thus $y_k = a_k - a_{k-2} = (x_k \oplus a_{k-2}) - a_{k-2}$ where $\oplus$ represents modulo-2 addition or subtraction. By way of example, the following Table represents values of k, $a_k$, and $y_k$ for an arbitrary sequence of bits $x_k$ with two initial arbitrary precoded bits $a_k$:

Consequently, due to changes in semiconductor carrier and photon density, the optical signal on the path 18 is produced with a small (e.g. about 1–2%) amplitude modulation and a frequency modulation (FM). The amplitude modulation is understood to be of little or no significance for this invention and is not discussed further. The FM produces a desired frequency shift or deviation, e.g. by equal amounts ±Δf, for the ±1 values of the encoded signal on the line 14, above and below a central frequency, e.g. f0, of the optical signal corresponding to the intermediate, 0 values of the encoded signal.

The exact amount of the frequency deviation Δf that is provided by the FM on each side of the frequency f0 is believed not to be critical to the invention and may be varied widely, and an optimum deviation can be determined by trial or simulation in particular circumstances. However, for a high bit rate system a convenient choice that appears to be appropriate is to make the frequency deviation Δf of the optical signal correspond to about half the bit rate of the signal being transmitted, i.e. 1.25 GHz for a bit rate of 2.5 Gb/s, so that the total frequency deviation 2Δf of the optical signal on the path 18 between the frequencies corresponding to the outer, or ±1, values of the symbols $y_k$ corresponds to the bit (or symbol) rate, i.e. 2.5 GHz for a bit rate of 2.5 Gb/s. Such a choice is assumed in the following description, but it is emphasized that other choices of frequency deviation may be made.

| k | −1 | 0 | 1 | 2 | 3 | 4 | 5 | 6 | 7 | 8 | 9 | 10 | 11 | 12 | 13 |
|---|---|---|---|---|---|---|---|---|---|---|---|---|---|---|---|
| $x_k$ | | | 1 | 1 | 1 | 1 | 0 | 1 | 0 | 0 | 1 | 0 | 0 | 0 | 1 |
| $a_k$ | 1 | 0 | 0 | 1 | 1 | 0 | 1 | 1 | 1 | 1 | 0 | 1 | 0 | 1 | 1 |
| $y_k$ | | | −1 | 1 | 1 | −1 | 0 | 1 | 0 | 0 | −1 | 0 | 0 | 0 | 1 |

As can be seen from the above example, the combination of the modified duobinary preceding and encoding produces a zero value of $y_k$ for each zero bit $x_k$, and produces ±1 values of $y_k$ for binary one bits $x_k$, so that the magnitude of each symbol $y_k$ directly represents the value of the respective bit $x_k$, and there is no error propagation (i.e. if a symbol $y_k$ contains an error, it affects only one bit). Consequently, direct detection and recovery of the original binary signal at the optical receiver is facilitated.

While the description here relates to modified binary encoding and precoding for the reasons given above, it can be appreciated that other forms of encoding, with or without preceding, can alternatively be used to provide the three-level encoded signal with the properties discussed above. In particular, it is observed that polybipolar encoding, as discussed above in relation to the curves 36 and 38 in FIG. 3, with precoding to avoid error propagation as explained above, may be used. It is noted that both MDB and polybipolar encoding use a PRS polynomial having (1−D) and (1+D) as factors, the former providing a zero amplitude at zero frequency and the latter providing a zero amplitude at a relative frequency of 0.5.

The three-level symbols $y_k$ produced as described above at the output of the encoder 10 on the line 14 in FIG. 1 are supplied as a modulating signal, with appropriate amplitudes and bias as is known in the art, to the semiconductor laser 16 to provide a desired frequency modulation of the optical signal produced by the laser. For example, the laser 16 can be a DFB semiconductor laser with an optical signal wavelength of about 1557 nm, whose bias current is directly modulated by the encoded signal on the line 14.

It can be appreciated from the above description that, because all of the properties (a), (b), and (c) described above are provided by the encoding in the encoder 10, the direct modulation of the laser 16 to produce the FM optical signal on the path 18 substantially reduces several significant limiting factors, as discussed above, for long-distance optical transmission of high bit rate signals.

As described above and illustrated in FIG. 1, the FM optical signal on the optical path 18 is supplied to the optical interference filter 20, the output optical signal from which is supplied via the optional optical filter 24 and the optical path 22 and eventually to an optical signal receiver (not shown in FIG. 1). The following description assumes that the filter 24 is present and is positioned in the optical path 22 as shown in FIG. 1, but as stated above it could alternatively be omitted or provided in the optical path 18. More generally, it can be appreciated that in the optical signal transmitter of FIG. 1 the filters 20 and 24 and the optical paths 18 and 22 are all in a series optical path, and so can be provided in any desired order or manner. Thus although the filters 20 and 24 (if present) are preferably provided as shown in FIG. 1 as parts of an optical signal transmitter as such, either or both of them could alternatively be provided at the receiver end of the optical path 22, and it is to be understood that the term "optical transmitter" as used herein is intended to embrace this.

Figure 5:
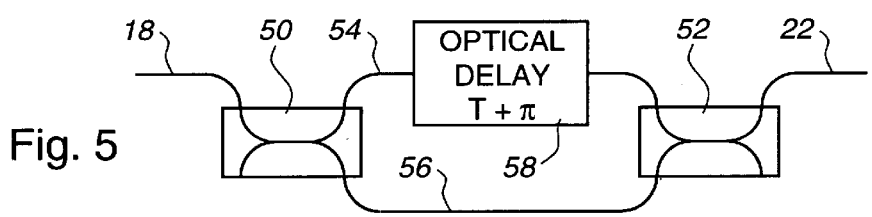
FIG. 5 schematically illustrates a form of an interference filter of the transmitter of FIG. 1.

As shown diagrammatically in FIG. 5, the interference filter 20 is desirably in the form of a Mach-Zehnder (MZ) interferometer comprising an optical splitter 50 to which the optical signal on the path 18 is supplied, and an optical combiner 52 providing the optical signal to the path 22, providing between them two optical paths 54 and 56 between which there is a relative or differential optical signal delay 58. As is well known, such an interference filter provides, from the optical signals of the paths 54 and 56, in the combiner 52 for the optical signal supplied to the path 22, maximum constructive interference when the optical signal delay 58 is an integer number of wavelengths of the optical signals to produce a zero phase difference between the signals being combined, and maximum destructive interference when the optical signal delay 58 is an integer plus a half number of wavelengths of the optical signals to produce a $\pm\pi$ phase difference between the signals being combined, with a sinusoidal variation in optical signal transmission between these limits.

Figure 6:
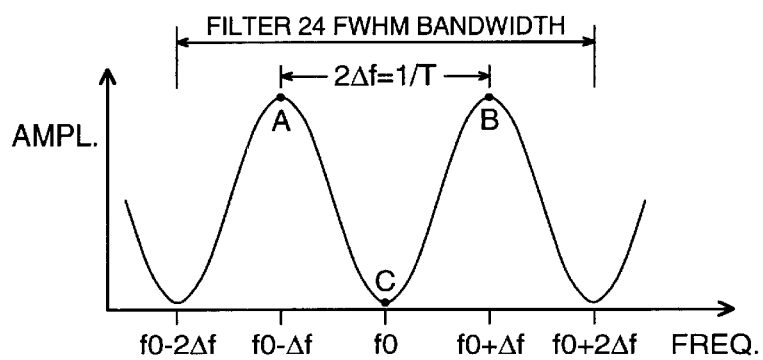
FIG. 6 is an amplitude-frequency diagram with reference to which operation of the interference filter of FIG. 5 is explained.

FIG. 6 illustrates this sinusoidal variation in amplitude of the optical signal transmitted by the interference filter 20 for a given optical signal delay 58 with varying frequency of the optical signal. Optimally the optical signal delay 58 provides a delay T which is the inverse of the total frequency deviation $2\Delta f$ of the optical signal on the path 18, so that as shown in FIG. 6 the period (on the frequency scale of FIG. 6) of this sinusoidal variation is $2\Delta f=1/T$. In the example above in which $2\Delta f=2.5$ GHz, then the optical signal delay T=400 ps (which in view of the choice discussed above is also the bit or symbol period of the electrical signal being transmitted).

The optical signal delay T is also precisely determined to be equal to an integer plus a half number of wavelengths of the optical signal at the central frequency f0, so that there is maximum destructive interference to produce a minimum amplitude of the optical signal transmitted to the path 22 at this frequency as illustrated in FIG. 6 at a point C. Consequently, at the optical signal frequencies $f0\pm\Delta f$, corresponding to the frequencies of the $\pm 1$ values of the symbols $y_k$, the interference filter 20 provides maximum constructive interference, and hence maximum optical signal transmission, as illustrated at points A and B in FIG. 6. As a result, the FM of the optical signal supplied to the interference filter 20 is converted into an amplitude modulation (AM) of the optical signal produced at the output of the interference filter 20 coupled to the path 22, with minimum amplitude at the point C corresponding to zero values of the symbols $y_k$ and zero values of the bits $x_k$; and with maximum amplitude at the points A and B corresponding to $\pm 1$ values of the symbols $y_k$ and 1 values of the bits $x_k$. Consequently, it can be seen that the optical signal produced at the output of the interference filter 20 and transmitted via the optical path 22 can be directly amplitude detected at the optical receiver to recover the binary input signal directly without any further processing or decoding.

The optional optical filter 24 is an in-line optical filter having for example a Gaussian-shape passband centered on the frequency f0 and with a FWHM (full-width half-maximum) bandwidth of for example $4\Delta f$ (5 GHz), to encompass two periods of the sinusoidal variation in amplitude of the optical signal transmitted by the interference filter 20, as is also shown in FIG. 6. This optional optical filter 24 thus serves to limit the frequencies of optical signals transmitted via the path 22 to the desired frequency range of about $f0\pm 2\Delta f$.

It can be appreciated that the optical signal produced by the interference filter 20 can alternatively be inverted (a maximum optical signal amplitude representing a 0 bit, and a minimum optical signal amplitude representing a 1 bit) by instead making the central frequency f0 correspond to a maximum constructive interference point of the sinusoidal variation of the interference filter 20. It can also be appreciated that the above description represents an idealized and optimum operation of the interference filter to convert from FM to AM (more accurately, to produce AM from FM, because the output signal of the interference filter 20 is both amplitude and frequency modulated). Idealized, because the FM optical signal does not change instantaneously, but gradually over a possibly significant part of the bit or symbol period t, between the frequencies f0, $f0-\Delta f$, and $f0+\Delta f$. Optimal, because variations of these frequencies f0, $f0-\Delta f$, and $f0+\Delta f$ relative to the maxima and minima of the sinusoidal variation of the interference filter response, and different responses which can be asymmetric about the central frequency f0 and which may occur with different types of interference filter 20, can be present while still providing a useful AM optical signal on the path 22.

Optimum operation as described above is dependent upon maintaining the central frequency f0 of the laser 16 and the delay T of the interference filter 20 so that the central frequency f0 corresponds to maximum destructive interference, i.e. a phase change of $\pi$, in the interference filter 20 to produce a minimum optical signal amplitude (or, in the inverted alternative, maximum constructive interference, or a phase change of 0, to produce a maximum optical signal amplitude). This can be done in any desired way, typically involving temperature control of the laser 16 and the interference filter 20 for thermal stability, and control of the bias current of the laser 16 via a feedback loop to provide precise control of the central frequency f0.

Figure 7:
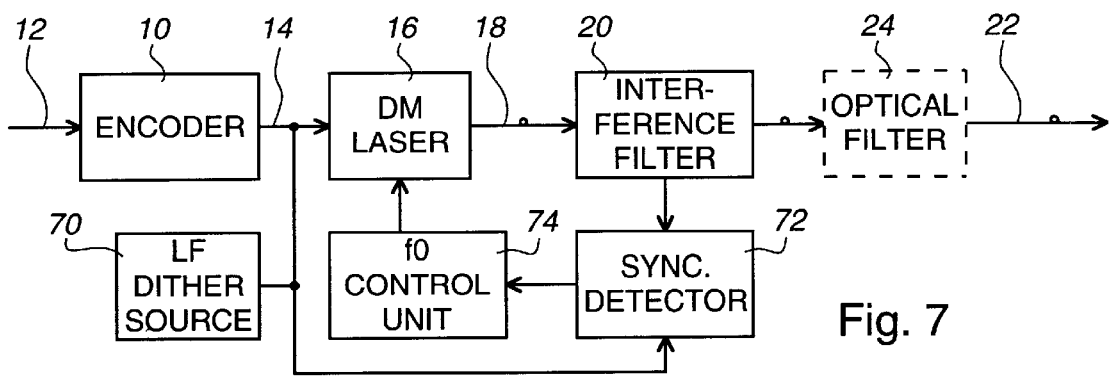
FIG. 7 schematically illustrates the optical signal transmitter of FIG. 1 with an additional control loop, in accordance with an embodiment of the invention.

By way of example in this respect, FIG. 7 illustrates the optical transmitter of FIG. 1 with an additional control loop provided for this purpose. As shown in FIG. 7, a low frequency (LF) dither source 70 provides an additional very small (e.g. 0.05%) amplitude modulation to the laser 16, and a synchronous optical detector 72 serves to detect this. An optical input of the detector 72 is coupled to an output of the interference filter 20, and more specifically to a second output branch of the optical signal combiner 52 shown unconnected in FIG. 5. A control unit 74 is responsive to an output of the synchronous detector 72 to control bias current, and hence the central frequency f0, of the laser 16 to maximize the strength of the detected dither, this corresponding to a maximum coupling of the optical signal to this second output branch at the central frequency f0, and hence a minimum coupling of the optical signal from the interference filter 20 to the path 22 at this frequency. Such a control loop can be extended to each laser central frequency in an array transmission system as described below, using orthogonal dithers for the respective lasers. Other and alternative control loop arrangements can be provided for a similar purpose and effect.

Figure 8:
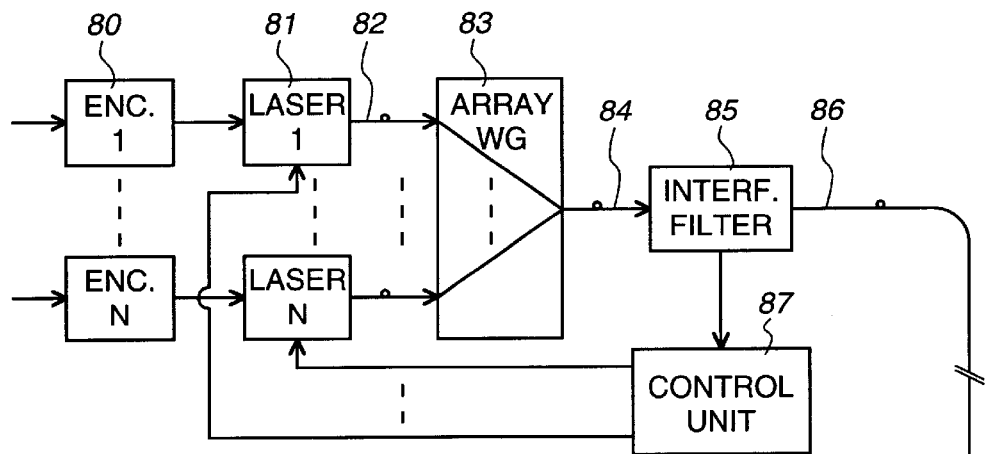
FIG. 8 schematically illustrates an array transmission system in accordance with an embodiment of the invention.

The optical transmitters described above are particularly suited for use in an array transmission system, for example as illustrated by FIG. 8.

As illustrated in FIG. 8, N binary signals each at a high bit rate, e.g. 2.5 Gb/s, are supplied to N MDB encoders 80, only two of which are shown for simplicity. For example N=40 so that the system of FIG. 8 provides a total transmission capacity of 100 Gb/s in what is referred to as one bundle, and ten such bundles may be multiplexed using wavelength division multiplexing to provide an overall transmission capacity of 1 Tb/s. The output of each encoder 80 is used to directly modulate a respective one of N DFB semiconductor lasers 81 in the manner described above, thereby producing respective optical signals on N optical paths 82. The N lasers 81 have central frequencies that differ from one another in increments of for example 5 GHz, providing N optical channels over a frequency band of for example 200 GHz.

These optical channels are combined by an array waveguide (WG) multiplexer or combiner 83 to a single optical path 84 leading to a single interference filter 85 constituted by a MZ interferometer as described above. The filter 85 produces AM of the optical channels as described above and supplies them to an optical path 86, which can be constituted by a long-distance single mode optical fiber simultaneously carrying the other bundles using WDM which for clarity is not represented in FIG. 8. A control unit 87 provides orthogonal control of the center frequencies of the N lasers 81 in dependence upon an optical signal derived from the second output branch of the interference filter 85. This orthogonal control can be provided for example in the manner described above with reference to FIG. 7, or separately for each of the N lasers by coupling this second output branch of the interference filter 85 via another array waveguide (not shown) forming a demultiplexer to respective control loop optical detectors (not shown). At a receiving end of the optical path 86, another array waveguide combiner 88 forms a demultiplexer to separate the optical channels for supply to respective optical signal amplitude detectors 89, from which the N binary signals are directly recovered.

Each of the array waveguides 83 and 88 serving to combine or separate the optical channels is conveniently constituted by a transmissive coupler using principles known in the art, for example from "An N×N Optical Multiplexer Using a Planar Arrangement of Two Star Couplers" by C. Dragone, IEEE Photonics Technology Letters, Vol. 3, No. 9, September 1991, pages 812–815. Such a coupler inherently also provides an optical channel filtering function corresponding, for each optical channel, to the function of the filter 24 of FIG. 1 as described above, and accordingly a separate optical filter 24 is not required in the system of FIG. 8.

It can be appreciated that the optical transmission system of FIG. 8 is particularly advantageous in that it not only incorporates the advantages described above with reference to FIGS. 1 to 7 for a single optical channel, in particular using direct modulation so that costs and risks of external modulators are avoided, but it also uses a single interference filter 85 for the N channels, making use of known waveguide array combiners 83 and 88 that also perform channel filtering, and direct detection and recovery of the binary signals at the receiver. Thus the system of FIG. 8 provides substantial advantages in comparison to known array transmission systems.

It can be appreciated that although as described above the laser is directly frequency modulated and the FM is converted to produce AM of the optical signal, the principles of the invention can be applied to three-level modulation of other parameters of the optical signal which can be optically converted into two-level AM, and to an optical transmission system in which an optical signal is produced by an unmodulated source and the respective parameter is externally modulated. For example, the polarization of an optical signal can be directly or externally modulated by the three-level encoded signal, and the modulated signal can be converted to an AM optical signal by optical filtering using a polarization filter.

Figure 9:
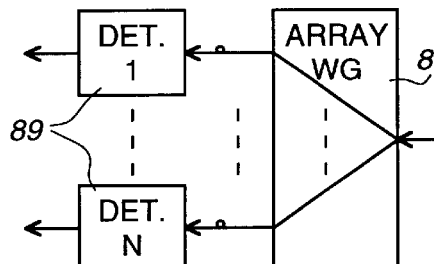
FIG. 9 schematically illustrates in a block diagram parts of an optical signal transmitter, in accordance with an alternative embodiment of the invention.
Figure 9:
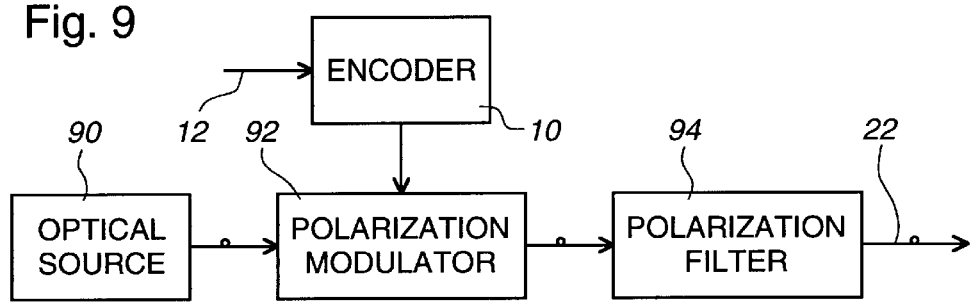

By way of example, FIG. 9 illustrates an optical transmitter in which an optical signal from an optical source 90, such as an unmodulated semiconductor laser, is coupled via a polarization modulator 92 and a polarization filter 94 to the path 22. The binary input signal on the line 12 is encoded by the three-level encoder 10 in the same manner as described above, and the output of the encoder 10 is supplied to the polarization modulator 92 to control the polarization of the optical signal in accordance with the three levels, for example a zero value of the encoded three-level signal producing horizontal polarization of the optical signal and ±1 values producing opposite vertical polarizations of the optical signal at the output of the modulator 92. In this case the polarization filter 94 can be oriented to pass an optical signal with vertical polarization and to suppress an optical signal with horizontal polarization, thereby converting the polarization modulation to an amplitude modulation of the optical signal supplied to the path 22. Although illustrated in FIG. 9 for a single channel, such an alternative arrangement can also be multiplexed for an array transmission system.

Thus although particular embodiments of the invention have been described in detail, it should be appreciated that the alternatives specifically mentioned above and numerous other modifications, variations, and adaptations may be made without departing from the scope of the invention as defined in the claims.

What is claimed is:

1. A method of producing an amplitude modulated optical signal representing a binary signal, comprising the steps of:
    encoding the binary signal to produce a three-level encoded signal, the encoded signal having two outer levels representing a first state of the binary signal and having an intermediate level representing a second state of the binary signal;
    producing an optical signal frequency modulated in accordance with the three-level encoded signal; and
    optically converting the frequency modulated optical signal in dependence upon its frequency to produce an amplitude modulated optical signal having first and second amplitudes representing the first and second states of the binary signal.

2. A method as claimed in claim 1 wherein the step of producing the frequency modulated optical signal comprises direct modulation of a semiconductor laser by the encoded signal.

3. A method as claimed in claim 2 wherein the step of optically converting the frequency modulated optical signal comprises conducting the optical signal via an interference filter having two paths producing constructive and destructive interference for different optical signal frequencies representing the two states of the binary signal.

4. A method as claimed in claim 3 wherein one and zero bits of the binary signal are represented by respective frequencies of the frequency modulated optical signal for which the interference filter provides constructive and destructive interference respectively.

5. A method as claimed in claim 4 and comprising the step of controlling a central frequency of the frequency modulated optical signal for maximum destructive interference in the interference filter for zero bits of the binary signal.

6. A method as claimed in claim 3 wherein the two paths of the interference filter provide a differential time delay of the optical signal which is of the same order as a bit period of the binary signal.

7. A method as claimed in claim 3 wherein the step of encoding encodes the binary signal in accordance with a polynomial having factors (1−D) and (1+D) where D is a delay operator for the binary signal.

8. A method as claimed in claim 3 wherein the step of encoding comprises modified duobinary encoding and precoding of the binary signal.

9. A method as claimed in claim 2 wherein the step of encoding encodes the binary signal in accordance with a polynomial having factors (1−D) and (1+D) where D is a delay operator for the binary signal.

10. A method as claimed in claim 2 wherein the step of encoding comprises modified duobinary encoding and precoding of the binary signal.

11. A method as claimed in claim 1 wherein the step of encoding encodes the binary signal in accordance with a polynomial having factors (1−D) and (1+D) where D is a delay operator for the binary signal.

12. A method as claimed in claim 1 wherein the step of encoding comprises modified duobinary encoding and precoding of the binary signal.

13. A method of transmitting a plurality of binary signals, comprising producing a plurality of optically multiplexed amplitude modulated optical signals, each representing a respective one of the plurality of binary signals, each by the method of claim 3, wherein the steps of encoding the binary signal and producing the frequency modulated optical signal are carried out individually for the respective binary signals to produce respective frequency modulated optical signals having different central frequencies, the method including a step of optically combining the frequency modulated optical signals, and wherein the step of optically converting the frequency modulated optical signals is carried out on the combined frequency modulated optical signals using a single interference filter.

14. A method as claimed in claim 13 wherein the step of optically combining the frequency modulated optical signals comprises optically filtering the frequency modulated optical signals in accordance with respective frequency channels.

15. A method as claimed in claim 14 wherein one and zero bits of each binary signal are represented by respective frequencies of the respective frequency modulated optical signal for which the interference filter provides constructive and destructive interference respectively.

16. A method as claimed in claim 15 and comprising the step of controlling a central frequency of each frequency modulated optical signal for maximum destructive interference in the interference filter for zero bits of the respective binary signal.

17. A method as claimed in claim 14 wherein the step of encoding encodes each binary signal in accordance with a polynomial having factors (1−D) and (1+D) where D is a delay operator for the binary signal.

18. A method as claimed in claim 14 wherein the step of encoding comprises modified duobinary encoding and preceding of each binary signal.

19. A method of producing an amplitude modulated optical signal representing a binary signal, comprising the steps of:
    encoding the binary signal to produce a three-level encoded signal, the encoded signal having two outer levels representing a first state of the binary signal and having an intermediate level representing a second state of the binary signal;
    producing an optical signal with a polarization that is modulated in accordance with the three-level encoded signal; and
    filtering the optical signal in dependence upon its polarization to produce an amplitude modulated optical signal having first and second amplitudes representing the first and second states of the binary signal.

20. A method as claimed in claim 19 wherein one and zero bits of the binary signal are represented by orthogonal polarizations of the modulated optical signal for which the step of filtering provides relative transmission and attenuation respectively.

21. A method as claimed in claim 19 wherein the step of encoding encodes the binary signal in accordance with a polynomial having factors (1−D) and (1+D) where D is a delay operator for the binary signal.

22. A method as claimed in claim 19 wherein the step of encoding comprises modified duobinary encoding and precoding of the binary signal.

23. An optical signal transmitter comprising:
    an encoder for encoding a binary signal to produce a three-level encoded signal, the encoded signal having two outer levels representing a first state of the binary signal and having an intermediate level representing a second state of the binary signal;
    a semiconductor laser directly modulated by the encoded signal to produce a frequency modulated optical signal; and
    an optical interference filter to which the frequency modulated optical signal is supplied, the interference filter producing an amplitude modulated optical signal by constructive and destructive interference at different frequencies of the frequency modulated optical signal.

24. An optical signal transmitter as claimed in claim 23 wherein the interference filter provides constructive and destructive interference for respective frequencies of the frequency modulated optical signal representing one and zero bits of the binary signal respectively.

25. An optical signal transmitter as claimed in claim 24 and including a control loop for controlling a central frequency of the frequency modulated optical signal for maximum destructive interference in the interference filter for zero bits of the binary signal.

26. An optical signal transmitter as claimed in claim 23 wherein the interference filter has two optical signal paths providing a differential delay of the same order as a bit period of the binary signal.

27. An optical signal transmitter as claimed in claim 23 wherein the encoder encodes the binary signal in accordance with a polynomial having factors (1−D) and (1+D) where D is a delay operator for the binary signal.

28. An optical signal transmitter as claimed in claim 23 wherein the encoder comprises a modified duobinary encoder and precoder.

29. An optical transmission system comprising:
    a plurality of N encoders each for encoding a respective binary signal to produce a respective three-level encoded signal having reduced bandwidth and d.c. components compared with the respective binary signal;
    N semiconductor lasers each directly modulated by a respective encoded signal to produce a respective one of N frequency modulated optical signals having different frequency ranges;
    an optical combiner arranged to combine the frequency modulated optical signals in their respective frequency ranges; and
    an optical interference filter to which the combined frequency modulated optical signals are supplied, the interference filter producing in each of said respective frequency ranges an amplitude modulation of the optical signal by constructive and destructive interference at different frequencies of the respective frequency modulated optical signal, the amplitude modulation providing two states representing the binary states of the respective binary signal.

30. An optical transmission system as claimed in claim 29 wherein one and zero bits of each binary signal are represented by respective frequencies of the respective frequency modulated optical signal for which the interference filter provides constructive and destructive interference respectively.

31. An optical transmission system as claimed in claim 30 and including control means for controlling a central frequency of each frequency modulated optical signal for maximum destructive interference in the interference filter for zero bits of the respective binary signal.

32. An optical transmission system as claimed in claim 29 wherein each encoder encodes the respective binary signal in accordance with a polynomial having factors (1–D) and (1+D) where D is a delay operator for the binary signal.

33. An optical transmission system as claimed in claim 29 wherein each encoder comprises a modified duobinary encoder and precoder.

34. An optical signal transmitter comprising:

an encoder arranged to encode a binary signal to produce a three-level encoded signal having reduced bandwidth and d.c. components compared with the binary signal;

a modulator arranged to modulate polarization of an optical signal in accordance with the three-level encoded signal; and a polarization filter arranged to filter the optical signal in dependence upon its polarization to produce an amplitude modulated optical signal having first and second amplitudes representing the first and second states of the binary signal.

35. An optical signal transmitter as claimed in claim 34 wherein one and zero bits of the binary signal are represented by orthogonal polarizations of the modulated optical signal for which the filter provides relative transmission and attenuation respectively.

36. An optical signal transmitter as claimed in claim 34 wherein the encoder encodes the binary signal in accordance with a polynomial having factors (1–D) and (1+D) where D is a delay operator for the binary signal.

37. An optical signal transmitter as claimed in claim 34 wherein the encoder comprises a modified duobinary encoder and precoder.

* * * * *